United States Patent [19]

Esterowitz et al.

[11] Patent Number: 5,107,509
[45] Date of Patent: Apr. 21, 1992

[54] TUNABLE SOLID STATE LASER WITH HIGH WAVELENGTH SELECTIVITY OVER A PRESELECTED WAVELENGTH RANGE

[75] Inventors: Leon Esterowitz, Springfield, Va.; Joseph F. Pinto, Laurel; Gregory J. Quarles, Bowie, both of Md.

[73] Assignee: The United States of America as respresented by the Secretary of the Navy, Washington, D.C.

[21] Appl. No.: 684,091

[22] Filed: Apr. 12, 1991

[51] Int. Cl.⁵ ................................................ H01S 3/10
[52] U.S. Cl. ......................................... 372/20; 372/105
[58] Field of Search ...................... 372/20, 19, 32, 92, 372/105, 33

[56] References Cited

U.S. PATENT DOCUMENTS

| | | | |
|---|---|---|---|
| 4,068,190 | 1/1978 | Ferguson | 372/105 |
| 4,689,794 | 8/1987 | Brosnan | 372/20 |
| 4,914,664 | 4/1990 | Woodward | 372/105 |
| 4,969,150 | 11/1990 | Esterowitz et al. | 372/20 |

FOREIGN PATENT DOCUMENTS

8601345  2/1986  PCT Int'l Appl. .

*Primary Examiner*—Georgia Epps
*Attorney, Agent, or Firm*—Thomas E. McDonnell; George Jameson

[57] ABSTRACT

A tunable solid state laser for producing a laser emission at any desired low or high laser gain transition in a predetermined range of wavelengths is disclosed. The tunable solid state laser comprises: a laser cavity defined by a first reflective element and an output coupler reflective element to form a reflective path therebetween; a laser crystal disposed in the laser cavity; means for optically exciting the laser crystal to produce a laser emission in the predetermined range of wavelengths; a tunable element disposed in the laser cavity between the laser crystal and one of the reflective elements for tuning the laser emission to any desired laser transition in the predetermined range of wavelengths; and a plurality of optical plates oriented at Brewster's angle in the reflective path in the laser cavity for suppressing oscillation of undesired wavelengths within the laser cavity, the optical plates being transparent to the laser emission over the predetermined range of wavelengths. The tunable solid state laser can further include an aperture disposed in the reflective path in the laser cavity to allow the laser to lase in the laser cavity only at the lowest order spatial transverse mode of the desired wavelength in the predetermined range of wavelengths.

41 Claims, 3 Drawing Sheets

TUNABLE SOLID STATE LASER WITH HIGH WAVELENGTH SELECTIVITY OVER A PRESELECTED WAVELENGTH RANGE

BACKGROUND OF THE INVENTION

1. Field of the Invention

The present invention relates to lasers and particularly to a tunable solid state laser for producing a laser emission at any desired low or high laser gain transition over a preselected wavelength range.

2. Description of the Prior Art

It is desirable that a tunable solid state laser system generate a laser output at any low or high laser gain transition over the operating range of wavelengths of that laser system. However, such a tunable laser system often encounters higher gain transitions which prevent a desired low gain laser transition from oscillating.

Techniques, such as specially designed mirror coatings, birefringent plates, prisms and other loss elements at an undesired high gain transition, have been used to generate a laser output at a desired low gain transition. These techniques are cumbersome and expensive, and are not flexible when it is desired to tune from one wavelength to another.

Single or multiple stacks of birefringent plates, oriented at Brewster's angle to the laser beam propagation, are commonly used as tuning devices in laser resonators or cavities. The principle of operation is based on the fact that the amount of reflection loss suffered by an electro-magnetic wave at a dielectric surface is dependent on the polarization (i.e., p-polarized or s-polarized) and the angle of incidence of the incident wave, as well as the index of refraction of the dielectric medium (or material of a plate). At an angle of incidence equivalent to Brewster's angle, $\beta$, p-polarized light suffers no reflection loss, while s-polarized light suffers a reflective loss depending on parameters given above. Thus, the tuning operation of a single birefringent plate is based on the phase difference accumulated by components of a linearly polarized input beam polarized along the fast and slow axis of the birefringent element. In general, different amounts of phase retardation accumulated by the fast and slow wave components will result in an output beam which is elliptically polarized. An elliptically polarized output will suffer substantial reflection losses at all Brewster surfaces in the laser cavity. However, for those wavelengths for which the phase difference is an integer number N of $2\pi$ radians, a linearly polarized input mode (p-polarized) undergoes a total retardation of N full waves, leaving the mode unaffected as it exits from the plate. This linearly polarized mode (p-polarized) suffers no reflection loss as it propagates past various Brewster surfaces inside the resonator, and thus corresponds to the operating eigenmode of the laser cavity.

In addition to the primary transmission maxima, the occurrence of secondary transmittance maxima must be considered in the design of a multiple plate birefringent tuning filter. Secondary transmittance maxima correspond to modes for which the total phase retardation of the thickness of the entire stack of one or more birefringent tuning filters corresponds to an integer number of half or full waves. Typically, the transmission value of secondary maxima may reach 75% or greater, depending upon the number of Brewster surfaces of the birefringent plates in the multiple plate birefringent tuning filter. Such high transmission values for these secondary peaks cannot be tolerated for broadband tuning operation of high gain laser systems. This is due to the fact that high secondary peak transmission values may allow strong transitions in the gain medium to oscillate, thereby limiting the tuning capacity of the birefringent tuner assembly. For flashpumped laser systems in particular, this wavelength switching can result in permanent damage to the laser rod end surfaces.

The above-discussed wavelength-switching problem is applicable to substantially all tunable solid state lasers which utilize various, associated, activator-ion-doped laser crystals to tune over various, associated wavelength ranges, whether each laser crystal is resonantly pumped or flashlamp pumped. The solution of such a problem in tunable solid state lasers is of particular interest and importance in relation to tunable lasers operating in the wavelength range between about 1.9 microns and about 2.1 microns, because of the many potential applications in medicine, optical communications and sensing. With the solution of this problem, it is believed that tunable solid state laser applications in other wavelength ranges, such as in the 1.4 micron to 1.6 micron eye-safe region, will also become more and more important.

At the present time, a number of scientists have attempted to solve this wavelength-switching problem, but without success.

OBJECTS OF THE INVENTION

According, one object of the invention is to provide a tunable solid state laser with high wavelength selectivity over a preselected wavelength range.

Another object of the invention is to provide a tunable solid state laser having the capability of selecting either low or high gain laser transitions over a preselected range of wavelengths.

Another object of the invention is to provide a tunable solid state laser for tuning its laser emission to any desired high or low gain laser transition within a preselected range of wavelengths.

Another object of the invention is to provide a tunable solid state laser which allows a low gain laser transition to oscillate in a laser cavity while competing with much higher gain transitions.

Another object of the invention is to provide a tunable solid state laser which suppresses oscillation of undesired wavelengths within its laser cavity and only lases at the lowest order spatial transverse mode of any desired wavelength in a preselected wavelength range.

Another object of the invention is to provide a tunable, flashpumped, Tm-activated garnet laser which produces a laser emission at substantially any desired wavelength between about 1.9 microns and about 2.1 microns.

A further object of the invention is to provide a tunable, flashpumped, Nd-activated garnet laser which produces a laser emission at any desired low or high gain laser transition between about 1.06 microns and about 1.44 microns.

SUMMARY OF THE INVENTION

The tunable solid state laser includes: a laser cavity defined by a first reflective element and an output coupler reflective element to form a reflective optical path therebetween; a laser crystal disposed in the laser cavity; means for optically exciting the laser crystal to produce a laser emission in a preselected range of wavelengths; a tunable element disposed in the laser cavity between the laser crystal and one of the reflective elements for tuning the laser emission to any desired wavelength in the preselected range of wavelengths; and a plurality of optical plates oriented at Brewster's angle in the optical path in the laser cavity for suppressing oscillation of undesired wavelengths within the laser cavity, the optical plates being transparent (or having a high transmissivity of, for example, greater than 99%) to laser emission over the preselected range of wavelengths. The tunable solid state laser can further include an aperture disposed in the optical path in the laser cavity to allow the laser to operate only at the lowest order spatial transverse mode of the desired wavelength in the preselected range of wavelengths.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

Before the drawings are discussed, it should be noted that the invention involves the implementation of an optical laser cavity that will allow a low laser gain transition to oscillate while competing with much higher gain transitions. The design of this optical laser cavity is generic and could be used either in laser systems with several fixed wavelength transitions (such as Nd:YAG where the strong 1.064 micron laser transition dominates the other laser lines at 1.32, 1.34, 1.36, 1.42 and 1.44 microns) or in continuously tunable systems (such as Cr;Tm:YAG which tunes between about 1.9 and about 2.1 microns and is dominated by the 2.01 micron laser transition). Other exemplary laser systems are: Tm:YAG which can be tuned between about 1.87 microns and about 2.16 microns; Tm:YSGG which can be tuned between about 1.85 microns and about 2.14 microns; Tm:GSGG which can be tuned between about 1.92 microns and about 2.04 microns; Ho:YAG which can be tuned between about 2.05 microns and about 2.15 microns and between about 2.84 microns and about 2.92 microns; and Er:YAG which can be tuned between about 2.7 microns and about 2.96 microns.

The optical laser cavity can be resonantly pumped or flashpumped. The wavelength range over which the laser system operates is determined by the dopant or dopants used in the laser crystal, as well as the optical elements used in the laser cavity. As discussed above, some of the exemplary dopants that could be used in the laser crystal are $Er^{3+}$, $Ho^{3+}$, $Nd^{3+}$ and $Tm^{3+}$. In addition, other activator ions which can be used are various ones of divalent ($Mn^{2+}$, $Co^{2+}$ and $Ni^{2+}$), trivalent ($Cr^{3+}$ and $Ti^{3+}$), and quadrivalent ($Cr^{4+}$ and $V^{4+}$) transition metal ions; trivalent actinides (U+); and divalent rare earth ions ($Sm^{2+}$, $Tm^{2+}$ and $Eu^{2+}$).

Figure 1:
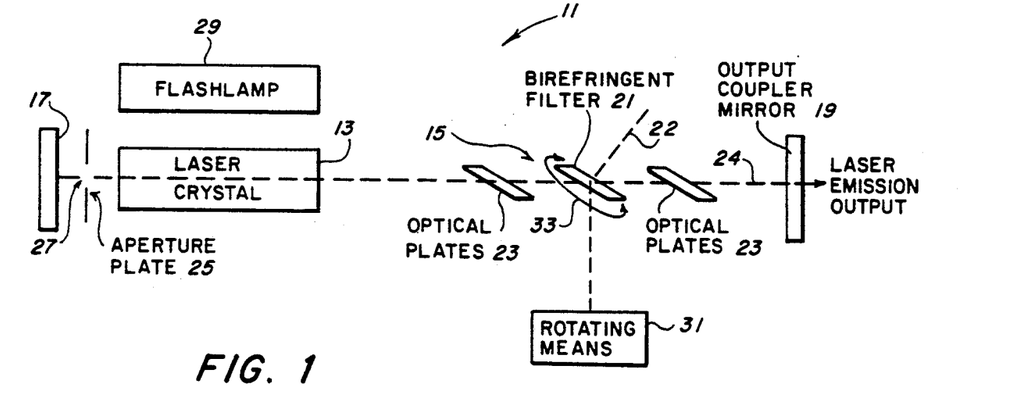
FIG. 1 illustrates a first embodiment of the invention.

Referring now to the drawings, FIG. 1 illustrates a tunable, solid state laser 11 in accordance with a first embodiment of the invention. For ease of understanding of the invention, the tunable, solid state laser 11 of FIG. 1 will be described in terms of a tunable, flashpumped, solid state laser 11 which includes a laser rod or crystal 13 which comprises an exemplary $Cr^{3+}$-sensitized, $TM^{3+}$-activated, YAG (yttrium aluminum garnet) host material to produce a laser beam or emission which can be tuned within the wavelength range from about 1.9 microns to about 2.1 microns. It should, however, be remembered that a different wavelength range can be realized by utilizing a laser crystal 13 which contains one or more different dopants and different associated optical elements.

The tunable, flashpumped, solid state laser 11 is comprised of the laser rod or crystal 13 disposed in a laser cavity 15 defined by optically-aligned first reflective element or mirror 17 and output coupler reflective element or mirror 19. The mirror 17 is highly reflective, while the mirror 19 is partially transmissive to a laser wavelength of 2 microns to provide the output coupling for the laser emission within the wavelength range of from about 1.9 microns to about 2.1 microns from the laser 11.

A birefringent tuner or birefringent filter 21 is inserted in the cavity 15, at Brewster's angle, between the laser crystal 13 and the output mirror 19. The birefringent tuner 21 is comprised of a stack of one or more exemplary birefringent quartz plates or birefringent filter plates (not shown) oriented at Brewster's angle to the direction of propagation of the laser emission in the laser cavity 15. Each of the birefringent plates of the tuner 21 has an optic axis (not shown) which lies in the plane of that birefringent plate and is aligned in parallel with each of the other optic axes. Tuning of the birefringent tuner 21 is accomplished by rotating the plates of the tuner 21 simultaneously about an axis (not shown) normal to the plane of each plate in the tuner 21.

The maximum primary transmission peak of an individual birefringent plate occurs at a wavelength given by:

$$\lambda = \frac{(n_o - n_e) t}{(\sin \beta) m} (1 - \cos^2 \beta \sin^2 \alpha) \qquad (1)$$

where:
 $n_o$ and $n_e$ are the respective ordinary and extraordinary indices,
 t is the plate thickness,
 $\beta$ is Brewster's angle,
 m is an integer, and
 $\alpha$ is the angle between the fast axis of the birefringent plate and the s (high loss) polarization of the Brewster surface.

The free spectral range of the birefringent tuner 21 is determined by the thinnest plate in the tuner 21. In general, the thickness of the thinnest plate is selected such that the desired tuning range of the laser 11 falls in the following range of $\alpha$ values:

$$10° \leq \alpha \leq 80° \quad (2)$$

Additional plates in the birefringent tuner 21, with thickness values which are integral multiples of the thinnest plate, are added to the birefringent tuner 21 to obtain the desired resolution bandwidth of the primary transmission peak. The bandwidth of an individual plate is proportional to the quantity $[(n_o - n_e) t]^{-1}$. Thus, the addition of thicker plates to the birefringent tuner 21 reduces the final bandwidth of the tuner 21.

The requirement that the thicknesses of additional plates be integral multiples of the thinnest plate of the birefringent tuner 21 insures that the primary transmission peak or maxima of each plate occurs at the same wavelength. Thus, the transmission function of the entire assembly of plates in the birefringent tuner 21 will be a convolution of individual plates, with the tuning range determined by the free spectral range of the thinnest plate and the resolution bandwidth determined by the combination of all of the plates in the tuner 21. For example, for tuning between 1.9 microns and 2.1 microns, a birefringent tuner consisting of two quartz plates with respective thicknesses of 1.02 millimeters (mm) and 2.04 mm can be used. Using equation (1), the calculated tuning range of this assembly of two plates (not shown) is between 1.8 microns and 2.39 microns for values of $\alpha$ ranging from 10° to 80°. The calculated bandwidths of the 1.02 mm and 2.04 mm plates are 13.7 nm and 6.85 nm, respectively.

It will be recalled that, in addition to the primary transmission peak or maxima, the occurrence of secondary transmittance maxima must be considered in the design of the multiple plate birefringent tuner 21, and that such secondary transmittance maxima occur for modes in which the total phase retardation of the entire stack thickness of the birefringent tuner 21 corresponds to an integer number of half or full waves. This situation results in reduced reflection losses from Brewster surfaces in the laser cavity 15. As a result of these reduced reflective losses, the transmission value of secondary maxima may reach 75% or greater. Such high secondary peak transmission values may allow strong transitions in the gain medium to oscillate, thereby limiting the tuning capacity of the birefringent tuner 21.

It has been determined that the value of the secondary peak transmission can be reduced by the insertion of additional Brewster surfaces on both sides of the birefringent tuner 21. Increased reflection losses at these additional Brewster surfaces reduce the peak transmission of secondary maxima and thus help to suppress potential oscillation of high gain peak wavelengths. More specifically, a set of optical plates 23, comprised of calcium fluoride, fused silica, barium fluoride or any other suitable transparent material to the wavelength range of interest of the laser 11, are disposed in the cavity 15 at Brewster's angle, and on opposite sides of the birefringent tuner 21, to insure that the operating polarization of the laser 11 is p-polarized.

The term "p-polarized" means that the electric field of the laser beam is parallel to the plane of incidence, which lies in the plane of FIG. 1 and is formed by the line 22 normal to the Brewster surfaces (not shown) in the tuner 21 and the optical path of the laser beam 24. On the other hand, the term "s-polarized" means the electric field of the laser beam is perpendicular to the plane of incidence.

It should be noted that the exemplary calcium fluoride ($CaF_2$) optical plates have a high transmission from about 0.35 microns to about 7 microns; that the exemplary fused silica optical plates have a high transmission from about 0.16 microns to about 2.3 microns; and that the exemplary barium fluoride ($BaF_2$) optical plates have a high transmission from about 0.2 microns to about 11 microns.

As discussed earlier, the amount of loss suffered by the s-polarized light will depend on the index of refraction of the optical plates. Thus, the number of desired optical plates can be chosen according to the required amount of reflective loss for the s-polarization light.

In a second way that the value of the secondary peak transmission can be reduced, the optical plates 23 oriented at Brewster's angle may be selectively disposed between adjacent plates (not shown) in the birefringent tuner 21. Other possible techniques for minimizing problems with secondary transmission peaks include the utilization of a laser rod 13 with Brewster-cut end faces and/or choosing appropriate plate thickness combinations calculated by Jones matrix analysis, which analysis is well known in the art.

The insertion of these exemplary additional Brewster surfaces of the optical plates 23, that are also oriented at Brewster's angle, on either both sides of the birefringent tuner 21 or between preselected adjacent birefringent plates (not shown) of the birefringent tuner 21 enable the laser 11 to suppress the oscillation of undesired wavelengths within the laser cavity 15. At the same time, these optical plates are transparent to laser emission over the preselected range of wavelengths. In other words, the optical plates 23 enable the wavelength of the laser emission of the tunable solid state laser 11 to be tuned by the birefringent tuner 21 to any desired low gain or high gain laser transition within the preselected range of wavelengths determined by the doped laser rod or crystal 13. For the crystal 13, which in this description of FIG. 1 comprises an exemplary $Cr^{3+}$-sensitized, $Tm^{3+}$-activated, YAG (yttrium aluminum garnet) host material, that preselected range of wavelengths is from about 1.9 microns to about 2.1 microns.

An optional opaque aperture plate 25 containing an aperture 27 may be inserted anywhere along the optical path between the mirrors 17 and 19 to insure TEMoo operation of the laser 11, where "TEM" represents "transverse electric and magnetic" and "TEMoo" represents "the lowest order TEM mode of operation at a selected wavelength" in the laser cavity 15. The opaque aperture plate 25, which can be an exemplary metallic plate containing the aperture 27, restricts the laser operation in the laser cavity 15 to the lowest order mode of operation for the wavelength selected by the birefringent tuner 21. For illustrative purposes, the aperture plate 25 is shown disposed between the laser crystal 13 and the highly reflective mirror 17.

An excitation means, such as a flashlamp 29 is placed in close proximity to the laser crystal 13 to pump the laser crystal 13. The flashlamp 29 can be pulsed by means (not shown) to emit pulses of light at a pulse repetition frequency of, for example, 1 Hz.

Tuning of the solid state laser 11 over the desired exemplary wavelength range from about 1.9 microns to about 2.1 microns can be achieved by using a rotating means 31, such as a motor or a thumbscrew, which is operationally coupled to the birefringent filter 21, to slowly rotate the birefringent filter 21 about its axis in either of the directions indicated by the arc 33.

The optical plates 23 and birefringent plates in the birefringent tuner 21, which are all oriented at Brewster's angle inside the laser cavity 15, insure that the operating polarization of the emission from the laser 11 is p-polarized.

In the operation of the exemplary flashpumped Cr;Tm:YAG laser 11 of FIG. 1, the laser 11 was tuned from about 1.94 microns to about 2.09 microns, using an exemplary two-plate birefringent tuner 21 comprised of two quartz plates of thicknesses of 1.02 mm and 2.04 mm, respectively. When the birefringent tuner 21 was rotated to a rotation angle of 32 degrees, the operating wavelength of the Cr;Tm:YAG laser 11 was found to be at 1.96 microns.

This 1.96 micron wavelength corresponds to a total phase retardation of $8\pi$ radians and $16\pi$ radians in the respective 1.02 mm and 2.04 mm plates of the two-plate birefringent tuner 21. A p-polarized mode at 1.96 microns is unaffected as it traverses the birefringent tuner 21. However, at this same rotation angle of 32 degrees, a secondary transmission peak occurs at a wavelength of 2.014 microns. Although this secondary transmission peak may have a value which is 75% or less than the value of the primary transmission peak value at 1.96 microns, the high gain of the Cr;Tm:YAG laser 11 at 2.014 microns would allow this 2.014 micron transmission to oscillate instead of the weaker gain transition at 1.96 microns. Specifically, the 2.014 micron wavelength undergoes a retardation of 11.6 times $2\pi$ radians through the 3.06 mm total stack thickness of the 1.02 mm and 2.04 mm plates of the two-plate birefringent tuner 21. In other words, a p-polarized mode at 2.014 microns will become almost entirely rotated into the s-polarized mode as it exits through the two-plate birefringent tuner 21.

However, by including the additional Brewster surfaces of the optical plates 23 at the exit surface of the birefringent tuner 21 (e.g., between the birefringent tuner 21 and the output coupler mirror 19), the s-polarized 2.014 micron mode will experience sufficient loss to prevent it from reaching the threshold condition required for laser oscillation in the laser cavity 15. It is also important to have an additional number of the Brewster surfaces of the optical plates 33 at the entrance surface of the birefringent tuner 21 (e.g., between the laser crystal 13 and the birefringent tuner 21) as well in order to sufficiently suppress incoming wavelengths polarized with an s-polarization. Without these additional Brewster surfaces of the optical plates 23, an s-polarized secondary mode at 2.014 microns in the above-discussed exemplary operation certainly would have satisfied the threshold for oscillation and would have caused the flashpumped laser 11 to switch to the high gain secondary peak at 2.014 microns.

Thus, when it is desired to tune the birefringent tuner 21 to a low gain laser transition, the Brewster-cut optical plates 23 in the laser cavity 15 operate to suppress the oscillation at higher gain laser transitions. This allows the laser cavity 15 to be tuned to the desired low gain transition by changing the birefringent tuner 21 without having the laser emission jump to an undesired higher gain transition. In a similar manner, when it is desired to tune the birefringent tuner 21 to a higher gain transition, the optical plates 23 operate to suppress the oscillations at other undesired laser transitions. Therefore, the tunable, flashpumped, solid state laser 11 of FIG. 1 has the capability of producing a laser emission at any desired low or high laser gain transition over a preselected wavelength range. As stated before, the wavelength range over which the laser 11 operates is basically determined by the particular activator ions used to dope an associated host material of the laser crystal 13, as well as by the optical elements used in the laser cavity 15.

The laser crystal 13 can have an exemplary laser host crystal material (not shown) which is selected from the broad group consisting of YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YALO (yttrium aluminum oxygen), GGG (gadolinium gallium garnet), YGG (yttrium gallium garnet), LLGG (lanthanum lutetium gallium garnet). As mentioned before, the host crystal material could also be comprised of mixtures or combinations of this group of crystal materials. The preferred group of host crystal materials is comprised of YAG, YSAG and YSGG, and the most preferred host crystal material is YAG.

The selected host crystal material of the laser crystal 13 is doped with a first effective percent concentration of $Cr^{3+}$ (chromium) sensitizer ions and with a second effective percent concentration of $Tm^{3+}$ (thulium) activator ions. When the laser crystal 13 is pumped or excited by a light pulse from the flashlamp 29, the laser crystal 13 develops an output pulse of laser emission with an associated slope efficiency.

The chief characteristic or requirement of a selected host crystal material is that it must have the capability of easily accepting a transition metal ion (such as $Cr^{3+}$ in this description) and a lanthanide or trivalent rare earth ion (such as $Tm^{3+}$ in this description). The dopant $Cr^{3+}$ ions and $Tm^{3+}$ ions must go into the host crystal material without significantly distorting the lattice of the host crystal material so that the quality of the host crystal material remains high.

The $Cr^{3+}$ ions are the sensitizer ions and their concentration is chosen so that there is good absorption into the host crystal material of the excitation pump from the flashlamp 29. If the $Cr^{3+}$ concentration is too low, there will be poor coupling of the excitation from the flashlamp 29 into the host crystal material. However, if the $Cr^{3+}$ concentration is too high, it will cause thermal lensing and other deleterious effects to the performance of the laser crystal 13. The term "effective percent concentration of $Cr^{3+}$ ions" means that the concentration of $Cr^{3+}$ ions in the host crystal material is sufficient to cause close to a 100% absorption of the excitation from the flashlamp 29 into the host crystal material, in addition to achieving uniform pumping throughout the laser host crystal material. The optimum $Cr^{3+}$ concentration will vary with the dimensions of the host crystal material of the laser crystal 13. Since uniform absorption or pumping is desirable, a lower $Cr^{3+}$ concentration should be used for a larger diameter crystal or rod 13, while a higher $CR^{3+}$ concentration should be employed for a smaller diameter rod 13.

The $Tm^{3+}$ ions are the activator ions which cause the lasing from the laser crystal 13. The $Tm^{3+}$ concentration must be high enough so that an efficient cross-relaxation process (to be explained), which populates the upper laser level, takes place. In addition, the $Tm^{3+}$ and $Cr^{3+}$ concentrations must be high enough so that an energy transfer between the $Cr^{3+}$ sensitizer ions and the $Tm^{3+}$ activator ions is efficient. However, if the $Tm^{3+}$ concentration is too high, losses will increase and the performance of the laser crystal 13 will suffer due to ground state absorption since the lower laser level is in the ground state manifold. The term "effective percent concentration of $Tm^{3+}$ ions" means that the concentration of $Tm^{3+}$ ions in the host crystal material is sufficient to enable a cross-relaxation process to be achieved with close to 100% effectiveness.

When the host crystal material is selected from the above-listed broad group of crystals (YAG, YSGG, GSGG, GSAG, YSAG, YAlO, GGG, YGG and LLGG) and is doped with a first effective percent concentration of $Cr^{3+}$ sensitizer ions between about 0.3% and about 3% and with a second effective concentration of $Tm^{3+}$ activator ions between about 2% and about 12%, a light pulse from the flashlamp 29 enables the laser rod 13 to produce a pulse of laser emission at substantially 2 microns.

When the host crystal material is selected from the preferred group of YAG, YSAG and YSGG crystals and is doped with a preferred first effective percent concentration of $Cr^{3+}$ sensitizer ions between about 0.3% and about 1.5% and with a preferred second effective percent concentration of $Tm^{3+}$ activator ions between about 4.5% and about 7.5%, a light pulse from the flashlamp 29 enables the laser rod 13 to produce a pulse of laser emission at substantially 2 microns.

When the host crystal material is YAG and is doped with a most preferred first effective percent concentration of $Cr^{3+}$ sensitizer ions between about 0.6% and about 0.9% and with a most preferred second effective concentration of $Tm^{3+}$ activator ions between about 5% and about 6%, a light pulse from the flashlamp 29 enables the laser rod 13 to produce a pulse of laser emission at a wavelength of substantially 2 microns.

It should be noted at this time that, by the use of the term of "percent concentration of $Cr^{3+}$ sensitizer ions", it is meant the percent of substitution of the $Cr^{3+}$ ions for the aluminum ions in YAG, for the scandium and gallium ion combination in YSGG, for the scandium and gallium ion combination in GSGG, for the scandium and aluminum ion combination in GSAG, for the scandium and aluminum ion combination in YSAG, for the aluminum ions in YAlO, for the gallium ions in GGG, for the gallium ions in YGG or for the lutetium and gallium ion combination in LLGG.

Similarly, by the use of the term of "percent concentration of $Tm^{3+}$ activator ions", it is meant the percent of substitution of the $Tm^{3+}$ ions for the yttrium ions in YAG, for the yttrium ions in YSGG, for the gadolinium ions in GSGG, for the gadolinium ions in GSAG, for the yttrium ions in YSAG, for the yttrium ions in YAlO, for the gadolinium ions in GGG, for the yttrium ions in YGG or for the lanthanum ions in LLGG.

It should be noted at this time that the selected host crystal material is doped with the first effective percent concentration of $Cr^{3+}$ sensitizer ions and with the second effective percent concentration of $Tm^{3+}$ activator ions by applying techniques well known to those skilled in the art and, hence, requires no further description of such techniques.

A more detailed description of an exemplary composition of the laser crystal or rod 13 and the operation of the laser rod 13, as well as the operation of the laser 11 of FIG. 1, will be given by now referring to FIG. 2.

Figure 2:
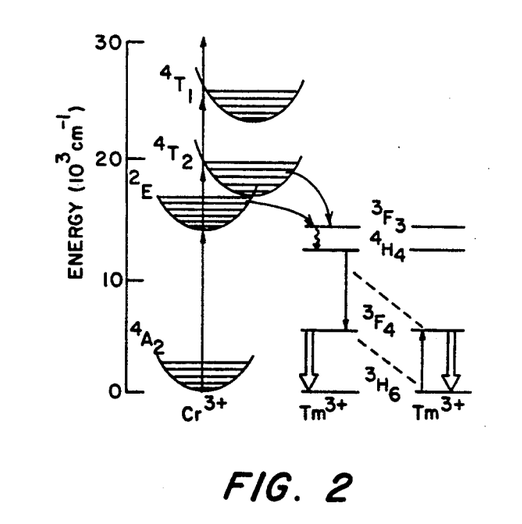
FIG. 2 illustrates the various energy levels of an exemplary chromium- and thulium- doped laser crystal.

FIG. 2 illustrates the various energy levels of the exemplary chromium ($Cr^{3+}$) and thulium ($Tm^{3+}$) doped laser crystal or laser rod 13 of FIG. 1. More specifically, FIG. 2 is a diagram of the various energy levels for the $Cr^{3+}$ and $Tm^{3+}$ ions in the laser rod 13, which can be comprised of an exemplary YAG host material. The importance of the $Cr^{3+}$ to $Tm^{3+}$ transfer efficiency to the 2 micron laser operation can be seen from the pumping scheme illustrated in FIG. 2.

In operation, each light pulse from the flashlamp 29 is absorbed in the $^4T_1$ and $^4T_2$ bands of the $Cr^{3+}$ ions. After a nonradiative decay to and within the $^4T_2$ and $^2E$ levels or states of the $Cr^{3+}$ ions, the excitation is transferred from the $Cr^{3+}$ ions to the $^3F_3$ and $^3H_4$ states of the $Tm^{3+}$ ions by way of dipole-dipole interactions. Nonradiative decay of the $^3F_3$ level places virtually all of the excited $Tm^{3+}$ ions in the $^3H_4$ state. Each excited $Tm^{3+}$ ion then interacts with a ground-state $Tm^{3+}$ in a cross-relaxation process which gives rise to two $Tm^{3+}$ ions in the $^3F_4$ state. This $^3F_4$ state or level is the upper laser level. Lasing or photon emission then occurs at about 2.014 microns as the excited $Tm^{3+}$ ions in the $^3F_4$ upper laser level decay to the $^3H_6$ lower laser level.

Cross-relaxation is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ cross-relaxation occurring is negligible for concentrations of $Tm^{3+}$ ions less than about 2%, but approaches unity for concentrations of $Tm^{3+}$ ions greater than about 5%.

A room temperature tunable laser emission within the wavelength range from about 1.9 microns to about 2.1 microns was derived by the present applicants. The composition of the laser rod 13 was selected to be favorable for all of the processes involved in flashlamp pumping at room temperature. As previously discussed in relation to FIG. 2, these processes were: absorption of the flashlamp light in the $^4T_1$ and $^4T_2$ bands of $Cr^{3+}$, nonradiative transfer of the excitation from the thermally mixed $^4T_2/^2E$ levels of $Cr^{3+}$ to the $^3F_3$ levels of $Tm^{3+}$, and cross-relaxation among $Tm^{3+}$ ions to populate the $^3F_4$ upper laser level.

A laser rod 13 having a YAG ($Y_3Al_5O_{12}$) host material was selected. The YAG laser rod 13 was 5.0 mm in diameter and 76.3 mm in length. The rod ends were polished flat and parallel and had broad anti-reflection coatings centered at 2.0 microns. The laser cavity mirrors 15 and 17 of FIG. 1 are respectively disposed adjacent to the polished ends of the laser rod 13. The diffuse-reflecting pump cavity had a pumping length of 69 mm so that at least 91% of the rod length was pumped by the flashlamp.

Within the YAG laser rod 13, a $Cr^{3+}$ ion concentration of 5.6 times $10^{19}$ cm$^{-3}$ (which is about a 0.6% concentration of $Cr^{3+}$ sensitizer ions, as defined above) and a $Tm^{3+}$ concentration of 8.3 times $10^{20}$ cm$^{-3}$ (which is about a 6.0% concentration of $Tm^{3+}$ activator ions, as defined above) was chosen.

The $Cr^{3+}$ ion concentration of 5.6 times $10^{19}$ cm$^{-3}$ (or 0.6% concentration) was chosen in order to provide an optimized balance between the efficient absorption of the flashlamp light in the laser rod 13 and uniform pumping of the mode volume in the 5 mm diameter YAG laser rod 13. Changing the value Of the $Cr^{3+}$ ion concentration had very little effect (<5%) on the $Cr^{3+}$ to $Tm^{3+}$ transfer efficiency in YAG.

The $Tm^{3+}$ ion concentration of 8.3 times $10^{20} cm^{-3}$ (or 6.0% concentration) was chosen to favor both the $Cr^{3+}$ to $Tm^{3+}$ energy transfer and the $Tm^{3+}$ cross relaxation processes. Previous work had shown that the $Cr^{3+}$ to $Tm^{3+}$ energy transfer was most efficient in a YAG host material, and that it occurs almost exclusively by a direct dipole-dipole interaction. The $Cr^{3+}$ to $Tm^{3+}$ transfer efficiency in the Cr:Tm:YAG material in the laser rod 13 was determined by measuring the $Cr^{3+}$ fluorescence following a pulsed laser excitation and was found to be 97.5%.

The doped laser rod 13 was pumped by a single simmered Xe flashlamp 29 having a 63.5 mm arc length, filled to 630 Torr, with a 4 mm bore diameter. The flashlamp 29 was pulsed at a pulse repetition frequency of one Hertz (1 Hz).

As stated before, tests have shown that the probability of the $Tm^{3+}$ cross-relaxation was negligible for $Tm^{3+}$ concentrations less than about 2%, but approaches unity for $Tm^{3+}$ concentrations greater than about 5%. The 6% $Tm^{3+}$ used in this description takes full advantage of the $Tm^{3+}$ cross-relaxation process. However, increasing the $Tm^{3+}$ above this 6% level is not advantageous because of losses due to ground-state absorption of the 2.0 micron laser emission.

Figure 3:
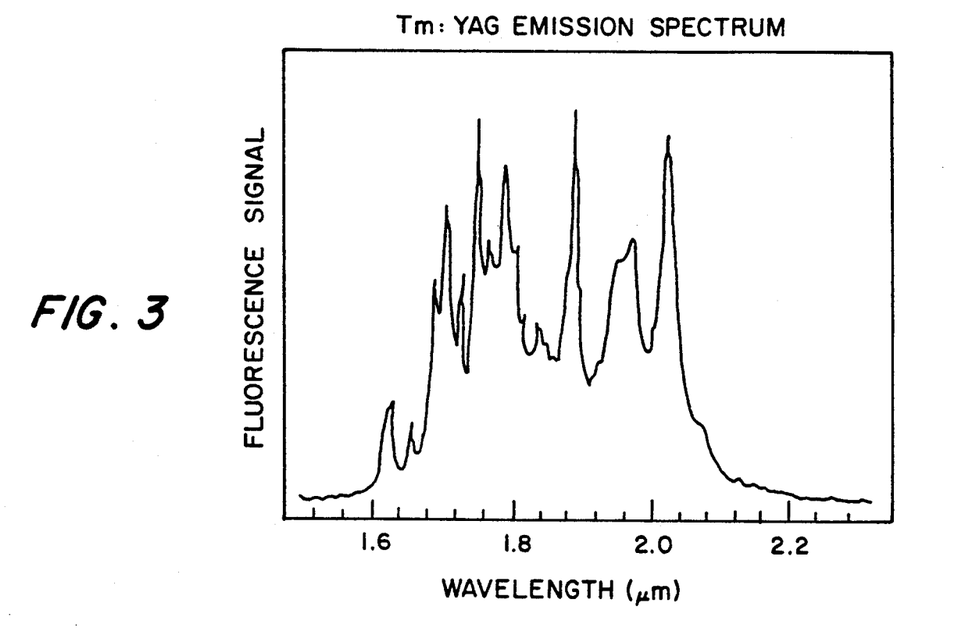
FIG. 3 illustrates the room-temperature fluorescence (emission) spectrum from the $Tm^{3+}$ $^3F_4$ level in a YAG host material.

FIG. 3 illustrates the room-temperature $Tm^{3+}$:YAG fluorescence (emission) spectrum. More specifically, the room temperature $Tm^{3+}$:YAG fluorescence spectrum shown in FIG. 3 clearly indicates that the peak of the spectral gain distribution occurs when the laser emission from the laser crystal or rod 13 has a wavelength of 2.014 microns. Other peaks occur at wavelengths of about 1.7 microns, 1.74 microns, 1.78 microns and 1.88 microns. These peaks dominate wavelengths along the spectral gain distribution of FIG. 3 and would tend to suppress the lower gains of such wavelengths. However, as stated before, the optical plates 23 operate to suppress wavelengths other than the wavelength that the birefringent tuner 21 is tuned to, thereby preventing wavelength switching from the wavelength that the birefringent tuner 21 is tuned to.

Figure 4:
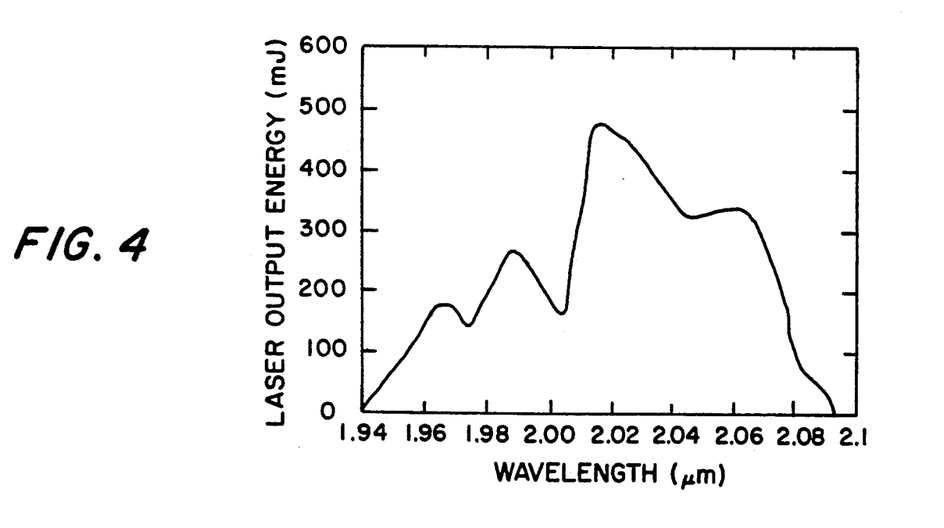
FIG. 4 illustrates an energy tuning curve for flashpumped Cr;Tm:YAG obtained with a 5% transmission broadband output coupler, with a flashlamp pump energy of 320 J.

FIG. 4 illustrates an energy tuning curve for flash-pumped Cr;Tm:YAG obtained with a 5% transmission broadband output coupler, with a flashlamp pump energy of 320 J (joules).

Figure 5:
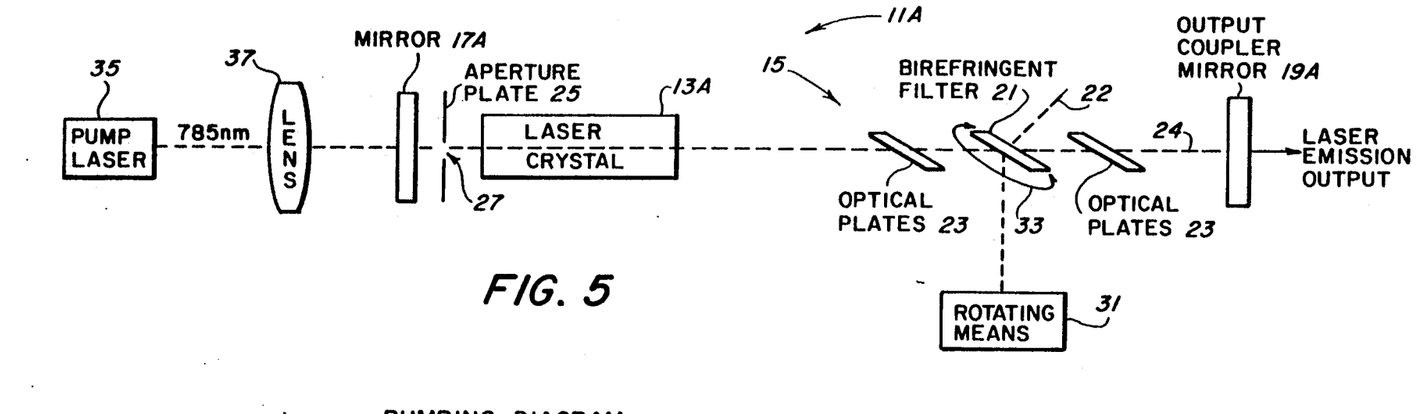
FIG. 5 illustrates a second embodiment of the invention.

FIG. 5 illustrates a tunable, solid state laser 11A in accordance with a second embodiment of the invention. For ease of understanding the second embodiment of the invention, the tunable, solid state laser 11A of FIG. 5 will be described in terms of an exemplary thulium-doped ($Tm^{3+}$-doped), solid state laser 11A which is resonantly pumped by a 785 nanometer (nm), continuous wave (CW) laser beam from a pump laser 35 to produce a CW laser emission which is tunable over the spectral range of from about 1.9 microns to about 2.1 microns. With the use of thulium activator ions in this resonantly pumped laser 11A, no chromium sensitizer ions are needed in the laser 11A. It should be remembered that a different wavelength range can be realized by utilizing a laser crystal (13A) which contains a different host material, different activator ions and different associated optical elements.

Pump laser 35, which emits the CW 785 nm laser beam to pump the laser 11A, is preferrably a GaAlAs laser diode array or a GaAlAs laser diode. However, the pump laser 35 can also be a titanium:sapphire laser which also can produce a CW pump beam at a wavelength of 785 nm. It should be noted at this time that the pump wavelength of 785 nm was chosen because 785 nm is the absorption peak of thulium ions in the solid state laser 11A.

The solid state laser 11A is comprised of a laser rod or crystal 13A disposed in a laser cavity 15A defined by optically-aligned, input reflective element or mirror 17A and output coupler reflective element or mirror 19A. Reflective elements 17A and 19A are disposed in the laser cavity 15A to form a reflective path therebetween.

The laser crystal 13A, which can have a length between 0.25 mm and 25 mm (millimeters), has an exemplary length in this description of approximately 3 millimeters (mm) and also has flat and parallel surfaces 23 and 25. The input mirror 17A has a high transmission (about 76%) at the pump wavelength of 785 nm and a high reflection (about 99%) at a wavelength of about 2 microns.

The output reflective element or mirror 19A, which defines the output end of the laser cavity 15A, is concave and has an exemplary 10 centimeter (cm) radius of curvature. This output mirror 19A is also highly reflective at about 2 microns. However, mirror 19A is approximately 0.5% transmissive at output wavelengths within the range of from about 1.91 microns to about 2.1 microns. Consequently, mirror 19A operates as an output coupler to output a portion of the laser emission developed by the laser crystal 13A when it is pumped by the 785 nm CW laser emission from the pump laser 35.

A birefringent tuner or birefringent filter 21 and optical plates 23 are inserted in the cavity 15A at Brewster's angle, between the laser crystal 13A and the output mirror 19A. The mirrors 17A and 19A have sufficient bandwidths (greater than 0.2 microns) to allow tuning over the desired wavelength range of from about 1.9 microns to about 2.1 microns. The 785 nm pump beam from the pump laser 35 is focused into the laser cavity 15A mode by a lens 37 having a 10 cm focal length. The birefringent filter 21 is oriented such that the linear polarization of the $Tm^{3+}$ doped laser crystal 13A is the same as that of the pump laser 35.

An optional opaque aperture plate 25 containing an aperture 27 may be inserted anywhere along the optical path between the mirrors 17A and 19A to insure TEMoo operation of the laser 11A. For illustrative purposes, the aperture plate 25 is shown disposed between the laser crystal 13A and the input mirror 17A.

The birefringent filter 21, optical plates 23 and aperture plate 25 are identical in structure, function and placement in the cavity 15A as they were in the cavity 15 of FIG. 1, and hence require no further description.

Tuning of the solid state laser 11A over the desired wavelength range of from about 1.9 microns to about 2.1 microns can be achieved by using a rotating means 31, such as a motor or thumbscrew, which is operationally coupled to the birefringent filter 21, to slowly rotate the birefringent filter 21 about its axis in either of the directions indicated by the arc 33.

Figure 6:
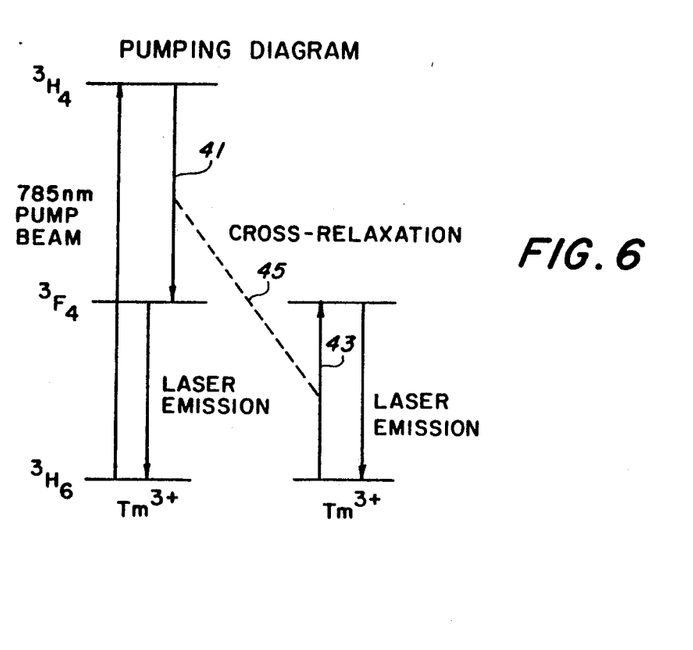
FIG. 6 illustrates the pumping diagram for an exemplary 12% amount of $Tm^{3+}$ activator ions in an exemplary YAG host material.

FIG. 6 illustrates the pumping diagram for an exemplary 12% concentration or amount of $Tm^{3+}$ activator ions (or an ion density of $1.67 \times 10^{21} cm^{-3}$) in an exemplary YAG host material in the laser crystal or rod 13A of FIG. 5. More specifically, FIG. 6 shows some of the various energy levels for the $Tm^{3+}$ ions in the laser crystal 13A. As shown, $^3H_4$ is the pump level for the CW 785 nm laser beam from the pump laser 35, $^3F_4$ is the upper laser level or state of the Tm-doped laser crystal 13A and $^3H_6$ is the lower laser level or state of the laser crystal 13A.

In operation, the $^3H_4$ level of $Tm^{3+}$ is pumped far above the laser threshold by the CW pump beam from the pump laser 35 (FIG. 5) at 785 nm, as shown in FIG. 6. This pumping far above the laser threshold allows the lasing of virtually all of the Stark components between the upper and lower laser levels of $Tm^{3+}$. The overlap of these laser transitions due to the width of the laser emissions produces a continuous tuning spectral range from about 1.9 microns to about 2.1 microns in the exemplary 12% $Tm^{3+}$:YAG laser crystal 13A when it is pumped by the CW 785 nm laser emission from the pump laser 35. The $^3F_4$ upper laser level (of the $Tm^{3+}$-doped laser crystal 13A) is populated by a cross-relaxation process (indicated by arrows 41 and 43 connected by a dashed line 45) in which two $Tm^{3+}$ ions, one in the $^3H_4$ pump level and one in the $^3H_6$ ground state, exchange energy. This energy exchange results in two $Tm^{3+}$ ions moving to the $^3F_4$ level. Lasing or photon emission from the laser crystal 13A then occurs at a wavelength around 2 microns as the excited $Tm^{3+}$ ions in the $^3F_4$ upper laser level decay to the $^3H_6$ lower laser level.

The above-described cross-relaxation process is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ cross-relaxation occurring is small for concentrations of $Tm^{3+}$ ions less than about 2%, but approaches unity for concentrations of $Tm^{3+}$ ions greater than about 5%.

The effectiveness of the above-described cross relaxation process increases as the $Tm^{3+}$ concentration is increased, up to at least a 50% concentration. The doping of the exemplary YAG host material in the laser crystal 15 with the exemplary 12% concentration or amount of $Tm^{3+}$ ensures dominance of the cross-relaxation process over fluorescence from the $^3H_4$ pump level. The effectiveness of the cross-relaxation pumping process produces a 56% slope efficiency for CW operation of the transition from the upper laser level of $^3F_4$ to the lower laser level of $^3H_6$. This 56% slope efficiency is greater than the theoretical limit of 39% in the absence of the cross-relaxation process.

The room-temperature fluorescent (emission) spectrum from the $Tm^{3+}$ $^3F_4$ level in a YAG host material in the solid state laser 11A of FIG. 5 has been discussed in relation to FIG. 3 and, hence, requires no further discussion.

Therefore, what has been described in preferred embodiments of the invention is a tunable solid state laser for tuning its laser emission to any desired high or low gain laser transition within a preselected range of wavelengths. The laser can be resonantly pumped or flashpumped and can operate within any given wavelength range, as determined by the type of dopant(s) and host material used in the laser crystal. For example, the laser crystal 13 of FIG. 1 or the laser crystal 13A of FIG. 5 could utilize a garnet host material doped with neodymium (Nd) activator ions sufficient to produce a laser emission from about 1.06 microns to about 1.44 microns when the laser 11 of FIG. 1 is flashpumped or when the laser 11A of FIG. 5 is resonantly pumped by an 808 nm pump beam from a suitable diode array. More specifically, the laser crystal 13A of FIG. 5 could utilize an oxide host material (such as YAG, YALO, YSAG, YSGG, YGG, GGG, GSAG, GSGG or LLGG or mixtures thereof) or a fluoride host material (such as $LiYF_4$, $BaY_2F_8$, $YF_3$ or mixtures thereof) and that host material could be doped with trivalent rare earth ions (such as $Er^{3+}$, $Ho^{3+}$, $Nd^{3+}$ or $Tm^{3+}$). The pump laser 35, which supplies the resonant pump beam to the trivalent rare earth ion dopant in the laser crystal 13A, could be a GaAlAs (gallium aluminum arsenide) diode laser, an InGaAs (indium gallium arsenide) diode laser or a titanium:sapphire laser. As is well known, a GaAlAs diode laser lases at about 800 nm, while an InGaAs diode laser lases at about 970 nm. The above-described invention has a wide range of applications, including various medical, sensing, pollution monitoring, laser ranging and aircraft windspeed and windshear measurement applications.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by letters patent of the United States is:

1. A solid state laser comprising:
   a laser cavity defined by a first reflective element and a output coupler reflective element to form a reflective path therebetween;
   a laser crystal disposed in said laser cavity;
   means for optically exciting said laser crystal to produce a laser emission in a preselected range of wavelengths;
   means disposed in said laser cavity between said laser crystal and one of said reflective elements for tuning said laser emission to a desired wavelength in said preselected range; and
   means oriented at Brewster's angle in said reflective path in said laser cavity for suppressing oscillation of undesired wavelengths within said laser cavity.

2. The laser of claim 1 further including:
   aperture means disposed in said reflective path in said laser cavity for allowing said laser to operate only at the lowest order spatial transverse mode of the desired wavelength in said preselected range of wavelengths.

3. The laser of claim 2 wherein said aperture means includes:
   an opaque element containing a hole disposed in said reflective path for only passing the lowest order spatial transverse mode of the desired wavelength therethrough.

4. The laser of claim 1 wherein said suppressing means includes:
   at least one optical plate oriented at Brewster's angle on each side of said tuning means to suppress the oscillation of undesired wavelengths within said laser cavity, said at least one optical plate being transparent to laser emission over the preselected range of wavelengths.

5. The laser of claim 1 wherein said suppressing means includes:
   first and second sets of optical plates oriented at Brewster's angle and respectively disposed on opposite sides of said tuning means to suppress the oscillation of undesired wavelengths within said laser cavity, said optical plates being transparent to laser emission over the preselected range of wavelengths.

6. The laser of claim 5 wherein:
said optical plates are comprised of material selected from the group consisting of calcium fluoride, fused silica and barium fluoride.

7. The laser of claim 1 wherein said suppressing means comprises:
Brewster-cut end faces on said laser crystal.

8. The laser of claim 1 wherein:
said laser crystal has Brewster-cut end faces for further suppressing the oscillation of undesired wavelengths within said laser cavity.

9. The laser of claim 1 wherein said tuning means includes:
a tuning element; and
means for rotating said tuning element about its optic axis to tune the laser emission to a different wavelength within said preselected range of wavelengths.

10. The laser of claim 9 wherein said tuning element includes:
a stack of birefringent plates oriented at Brewster's angle to the direction of propagation of said laser emission.

11. The laser of claim 10 wherein:
said birefringent plates have predetermined thicknesses, with the thicker ones of said birefringent plates having integer multiples of the thickness of the thinnest said birefringent plate.

12. The laser of claim 9 wherein said tuning element includes:
at least one birefringent plate oriented at Brewster's angle to the direction of propagation of said laser emission.

13. The laser of claim 12 wherein:
said at least one birefringent plate has substantially flat and substantially parallel first and second surfaces.

14. The laser of claim 13 wherein:
said at least one birefringent plate is comprised of a material selected from the group consisting of sapphire and quartz, and said at least one birefringent plate is disposed in said laser cavity at the Brewster angle substantially between the normal to said first surface of said at least one birefringent plate and the path of said laser emission from said laser crystal.

15. The laser of claim 2 wherein:
said tuning means includes a tuning element comprised of a stack of birefringent plates oriented at Brewster's angle to the direction of propagation of said laser emission, each of said birefringent plates having an optic axis which lies in the plane of that birefringent plate and is aligned in parallel with each of the other said optic axes; and means for rotating said tuning element about an axis normal to said optic axes to tune the laser emission to a different wavelength within said plurality of wavelengths; and
said aperture means includes an opaque element containing a hole in said reflective path for only passing the lowest order spatial transverse mode of the desired wavelength therethrough.

16. The laser of claim 15 wherein:
said birefringent plates have predetermined thicknesses, with the thicker said birefringent plates having integer multiples of the thickness of the thinnest said birefringent plate.

17. The laser of claim 15 wherein said suppressing means includes:
a plurality of optical plates oriented at Brewster's angle and selectively disposed between preselected adjacent birefringent plates in said tuning element to suppress the oscillation of undesired wavelengths within said laser cavity, said optical plates being transparent to laser emission over the preselected range of wavelengths.

18. The laser of claim 17 wherein:
said optical plates are comprised of a material selected from the group consisting of calcium fluoride, fused silica and barium fluoride.

19. The laser of claim 17 wherein:
said birefringent plates have predetermined thicknesses, with the thicker said birefringent plates having integer multiples of the thickness of the thinnest said birefringent plate.

20. The laser of claim 15 wherein:
said suppressing means includes first and second sets of optical plates oriented at Brewster's angle and respectively disposed on opposite sides of said stack of birefringent plates to suppress the oscillation of undesired wavelengths within said laser cavity, said optical plates being transparent to laser emissions over the preselected range of wavelengths.

21. The laser of claim 20 wherein:
said birefringent plates have predetermined thicknesses, with the thicker said birefringent plates having integer multiples of the thickness of the thinnest said birefringent plate.

22. The laser of claim 1 wherein:
said laser crystal includes a host material doped with activator ions to produce a laser emission in a preselected range of wavelengths when said laser crystal is optically excited to produce said laser emission.

23. The laser of claim 22 wherein:
said host material is a garnet host material; and
said preselected activator ions in said garnet host material comprise a dopant of $Nd^{3+}$ ions to enable said laser crystal to produce a laser emission within the wavelength range from about 1.06 microns to about 1.44 microns when said laser crystal is optically excited by said optically exciting means.

24. The laser of claim 22 wherein:
said preselected activator ions in said host material comprise a dopant of $Tm^{3+}$ ions; and
said host material further includes a dopant of $Cr^{3+}$ sensitizer ions.

25. The laser of claim 24 wherein:
said host material is selected from the group consisting of YAG, YSGG, GSGG, GSAG, YSAG, YAlO, GGG, YGG, LLGG, and mixtures thereof;
said dopant of $Cr^{3+}$ ions has an effective percent concentration of between about 0.3% and about 3%; and
said dopant of $Tm^{3+}$ ions has an effective percent concentration of between about 2% and about 12%.

26. The laser of claim 24 wherein:
said host material is selected from the group consisting of YAG, YSAG, YSGG and GSGG;

said dopant of $Cr^{3+}$ ions has an effective percent concentration of between about 0.3% and about 1.5%; and said dopant of $Tm^{3+}$ ions has an effective percent concentration of between about 4.5% and about 7.5%.

27. The laser material of claim 24 wherein:
said host material is YAG;
said dopant of $Cr^{3+}$ ions has an effective percent concentration of between about 0.6% and about 0.9%; and
said dopant of $Tm^{3+}$ ions has an effective percent concentration of between about 5% and about 6%.

28. The laser of claim 1 wherein:
said optically exciting means is a flashlamp.

29. The laser of claim 28 wherein:
said exciting means is a Xe flashlamp.

30. The laser of claim 15 wherein said exciting means includes:
means for pumping with a CW beam at a preselected wavelength; and
optical means disposed between said pumping means and said laser crystal for matching the CW pump beam to said laser crystal;
said laser crystal being excited by said CW pump beam to produce a CW laser emission in said preselected range of wavelengths.

31. The laser of claim 30 wherein said pumping means includes:
a laser diode source.

32. The laser of claim 30 wherein said pumping means includes:
a laser for emitting the CW pump beam at a wavelength of approximately 0.785 microns.

33. The laser of claim 24 wherein:
said $Cr^{3+}$ and $Tm^{3+}$ doped laser crystal is responsive to light from said exciting means for absorbing that light in the $^4T_1$ and $^4T_2$ bands of said $Cr^{3+}$ sensitizer ions, resulting in a nonradiative transfer of the excitation from the thermally mixed $^4T_2/^2E$ levels of the $Cr^{3+}$ sensitizer ions to the $^3F_3$ level of the $Tm^{3+}$ activator ions and a cross-relaxation among the $Tm^{3+}$ activator ions to populate the $^3F_4$ upper laser level to enable said laser crystal to produce a laser emission corresponding to the $^3F_4$-$^3H_6$ laser transition having the wavelength of substantially 2 microns.

34. The laser of claim 22 wherein:
said laser crystal is substantially in the form of a cylindrical laser rod whose long dimension is along the cylinder axis; and
said exciting means is a flashlamp having a long dimension along a first axis which is substantially parallel to said cylinder axis of said cylindrical laser rod for enabling said $Cr^{3+}$ ions in said cylindrical laser rod to absorb light from said flashlamp along the long dimension of said laser rod.

35. The laser of claim 34 wherein:
said preselected activator ions in said host material comprise a dopant of $Tm^{3+}$ ions; and
said host material further includes a dopant of $Cr^{3+}$ sensitizer ions.

36. The laser of claim 35 wherein:
said host material is selected from the group consisting of YAG, YSGG, GSGG, GSAG, YSAG, YAlO, GGG, YGG, LLGG, and mixtures thereof;
said host material is doped with an effective percent concentration of $Cr^{3+}$ sensitizer ions between 0.3% and 3% and with an effective percent concentration of $Tm^{3+}$ activator ions between 2% and 12%.

37. The laser of claim 35 wherein:
said host crystal material in said laser rod is selected from the group consisting of YAG, YSAG, YSGG and GSGG; and
said host material is doped with an effective percent concentration of $Cr^{3+}$ sensitizer ions between 0.3% and 1.5% and with an effective percent concentration of $Tm^{3+}$ activator ions between 4.5% and 7.5%.

38. The laser of claim 35 wherein:
said host material in said laser rod is YAG; and
said YAG host material is doped with an effective percent concentration of $Cr^{3+}$ sensitizer ions between 0.6% and 0.9% and with an effective percent concentration of $Tm^{3+}$ activator activator ions between 5% and 6%.

39. A solid state laser comprising:
a laser cavity defined by an input reflective element and an output coupler reflective element to form a reflective optical path therebetween;
a laser crystal disposed in said laser cavity, said laser crystal having a host material selected from the group consisting of YAG, YALO, YSAG, YSGG, YGG, GGG, GSAG, GSGG, LLGG and mixtures thereof, said host material being doped with $Cr^{3+}$ sensitizer ions and $Tm^{3+}$ activator ions sufficient to produce a laser emission in a preselected range of wavelengths when said laser crystal is optically excited to produce said laser emission;
flashlamp means for exciting said laser crystal to product a pulsed laser emission in the range of a plurality of wavelengths determined by Stark components in the $^3F_4$ to $^3H_6$ laser transition in said thulium activator ions when said laser crystal is excited by said exciting means;
means disposed in said laser cavity between said laser crystal and one of said reflective elements and oriented at Brewster's angle in said reflective path for tuning said laser emission to any desired one of said plurality of wavelengths within the range between approximately 1.9 microns and approximately 2.1 microns; and
means oriented at Brewster's angle in said reflective path on at least one side of said tuning means for suppressing oscillation of undesired wavelengths within said laser cavity and only enabling said desired wavelength to pass out of said output coupler reflective element.

40. The laser of claim 39 further including:
aperture means disposed in said optical path in said laser cavity for allowing said laser to operate in said laser cavity only at the lowest order spatial transverse mode of said desired one of said plurality of wavelengths within the range between approximately 1.9 microns and approximately 2.1 microns.

41. A solid state laser comprising:
a laser cavity defined by an input reflective element and an output coupler reflective element to form a reflective optical path therebetween;
a laser crystal disposed in said laser cavity, said laser crystal having a host material selected from the group consisting of YAG, YALO, YSAG, YSGG, YGG, GGG, GSAG, GSGG, LLGG, $LiYF_4$, $BaY_2F_8$, $YF_3$ and mixtures thereof, said host material being doped with trivalent rare earth activator ions selected from the group consisting of $Er^{3+}$, $Ho^{3+}$, $Nd^{3+}$ and $Tm^{3+}$ to produce a laser emission in a preselected range of wavelengths when said laser crystal is optically excited to produce said laser emission;

resonant pumping means for exciting said laser crystal to produce a laser emission in said preselected range of wavelengths when said laser crystal is excited by said resonant pumping means, said resonant pumping means being selected from the group consisting of a GaAlAs diode laser, an InGaAs diode laser and a titanium:sapphire laser;

means disposed in said laser cavity between said laser crystal and one of said reflective elements and oriented at Brewster's angle in said reflective path for tuning said laser emission to a desired wavelength in said preselected range of wavelengths; and means oriented at Brewster's angle in said reflective path on at least one side of said tuning means for suppressing oscillations of undesired wavelengths within said laser cavity and only enabling said desired wavelength to pass out of said output coupler reflective element.

* * * * *